Nov. 24, 1931.  H. R. TRAPHAGEN  1,833,624
WHEELED CULTIVATOR
Filed Dec. 20, 1930  6 Sheets-Sheet 1

Inventor
Harry R. Traphagen
By Fisher, Clapp, Soans + Pond

Nov. 24, 1931.    H. R. TRAPHAGEN    1,833,624
WHEELED CULTIVATOR
Filed Dec. 20, 1930    6 Sheets-Sheet 4

Inventor
Harry R. Traphagen
By Fisher, Clapp, Soans + Pond, Attys

Nov. 24, 1931.  H. R. TRAPHAGEN  1,833,624
WHEELED CULTIVATOR
Filed Dec. 20, 1930   6 Sheets-Sheet 5

Inventor
Harry R. Traphagen
By Fisher, Clapp, Soans & Pond, Attys.

Nov. 24, 1931.   H. R. TRAPHAGEN   1,833,624
WHEELED CULTIVATOR
Filed Dec. 20, 1930   6 Sheets-Sheet 6
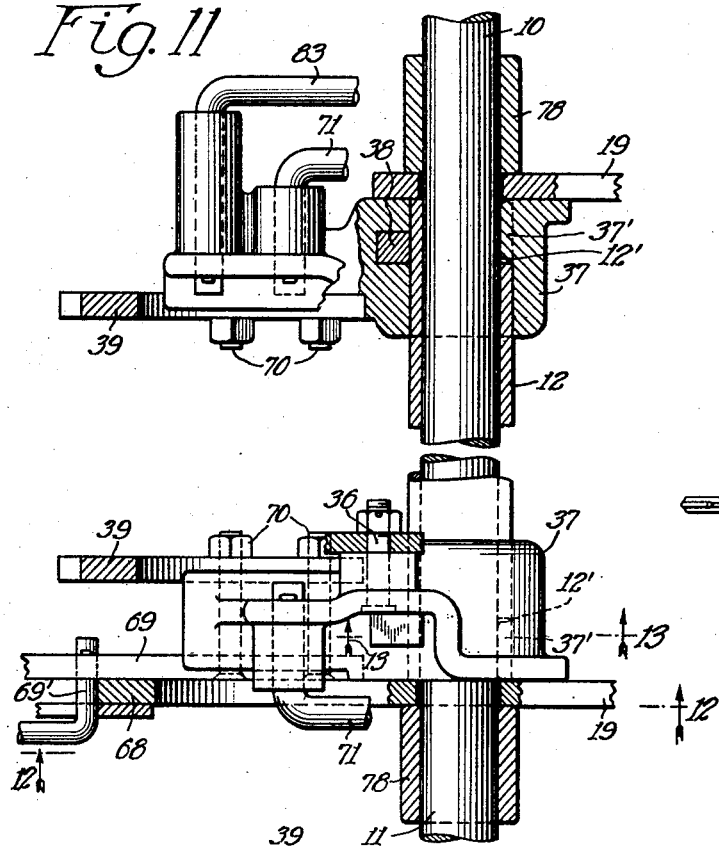
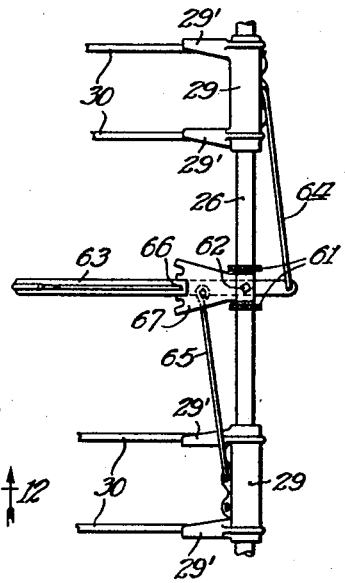
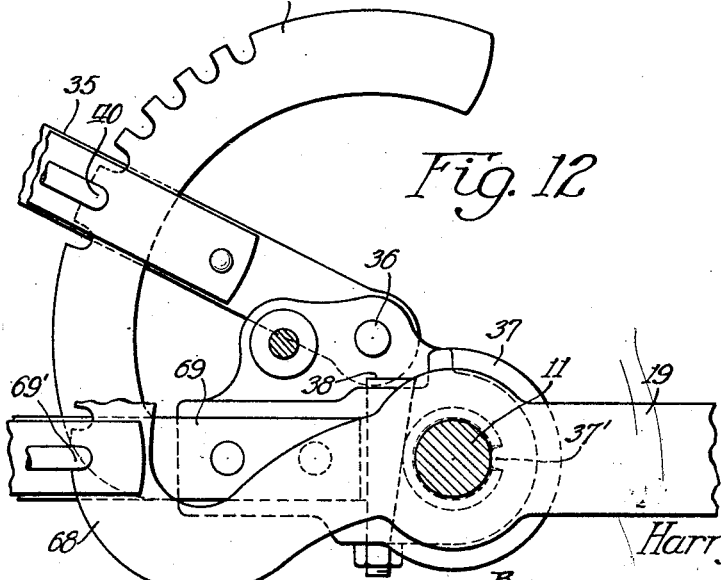
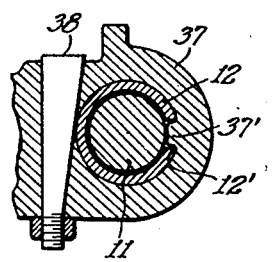
Inventor
Harry R. Traphagen
By Fisher, Clapp, Soans & Pond, Attys.

Patented Nov. 24, 1931

1,833,624

UNITED STATES PATENT OFFICE

HARRY RANDALL TRAPHAGEN, OF ROCKFORD, ILLINOIS, ASSIGNOR TO J. I. CASE COMPANY, OF RACINE, WISCONSIN, A CORPORATION OF WISCONSIN

WHEELED CULTIVATOR

Application filed December 20, 1930. Serial No. 503,662.

This invention relates to the art of wheeled cultivators employing freely suspended plow gangs, and has reference more particularly to that type of cultivator known as combined beam lift and frame balance, wherein the cultivator is equipped with a connected mechanism for lifting the plow gangs above the ground and simultaneously shifting the frame forwardly on the ground wheels in the line of draft, so as to maintain the center of gravity substantially in the vertical plane of the wheel axles, in order to prevent an upward tilting of the pole due to the weight of the plow gangs when raised above the ground.

The leading object of the present invention is to provide an improved and simplified mechanism, operable by a single master lever, for lifting the plow gangs and at the same time shifting the frame forwardly to maintain a substantially even balance of the cultivator when the cultivating implements are elevated. Another object of the invention is to provide an improved steering mechanism for cultivators of that type wherein the wheel axles are vertically journaled in or on the arch bar and the steering is effected by angling the wheels on their vertical bearings.

Still other objects and attendant advantages of the invention will become apparent to persons skilled in the art as the same becomes better understood by reference to the following detailed description, taken in connection with the accompanying drawings wherein I have illustrated one practical and approved embodiment of the invention, and in which—

Fig. 10 is a detail plan view of the mechanism for shifting the plow gangs sidewise.

Fig. 11 is an enlarged horizontal section through the main frame yoke and the castings carrying the master lever and the adjusting levers and their segment bars.

Fig. 12 is an enlarged side elevation, in section through the wheel yoke of one of the segments carrying the master lever and one of the gang adjusting levers and its segment.

Fig. 13 is a sectional detail taken on the line 13—13 of Fig. 11.

Fig. 14 is a detail section taken on the line 14—14 of Fig. 3.

Figure 4:
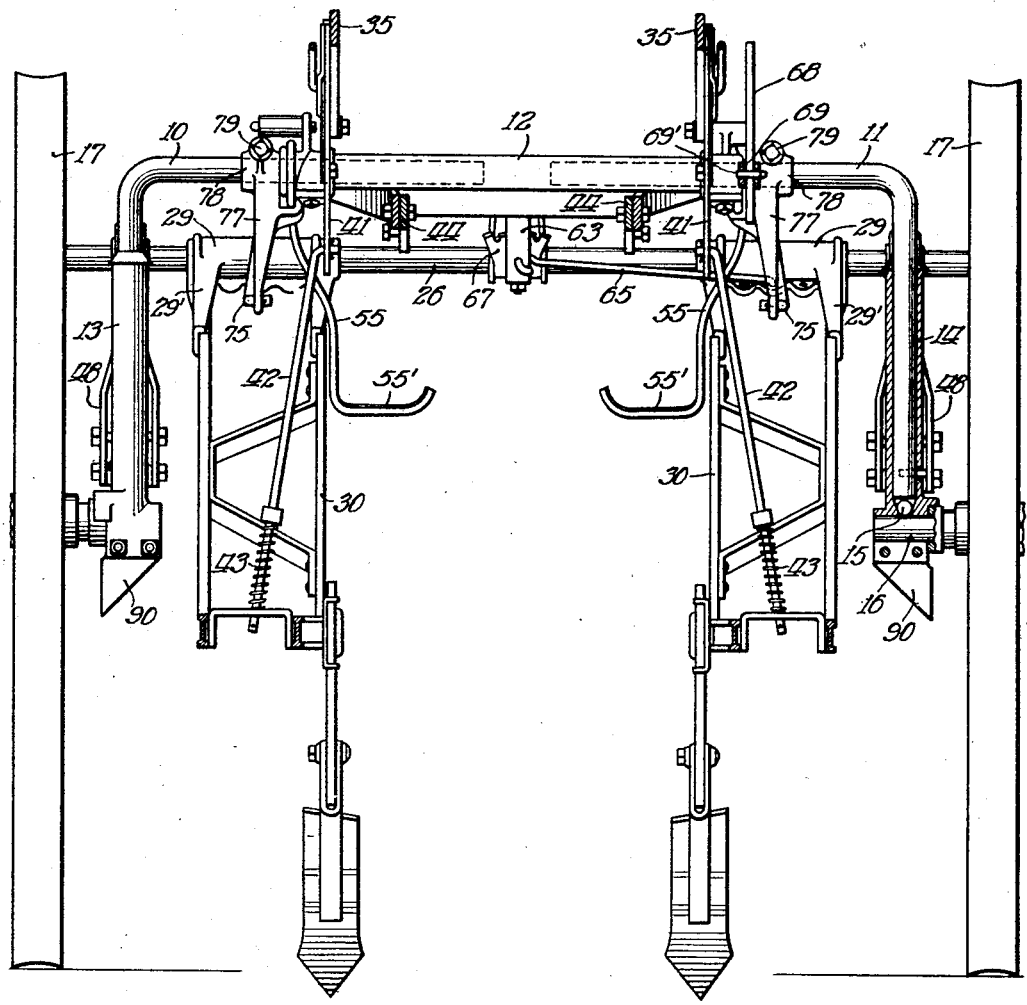
Fig. 4 is a vertical section taken on the line 4—4 of Fig. 1, looking from the rear.

First describing the frame structure of the implement, and referring to Fig. 4, the usual arch bar of the cultivator is, in this instance, made up of a pair of L-shaped end sections 10 and 11, and an intermediate tubular section 12 into which the horizontal limbs of the end sections 10 and 11 telescope. The vertical limbs of the end sections 10 and 11 are journaled in vertical socket members 13 and 14, said socket members preferably being equipped at their bottoms with anti-friction thrust bearings in the form of a ball 15. The lower ends of the socket members 13 and 14 carry the stub axles 16 on which the usual wheels 17 are journaled.

Figure 2:
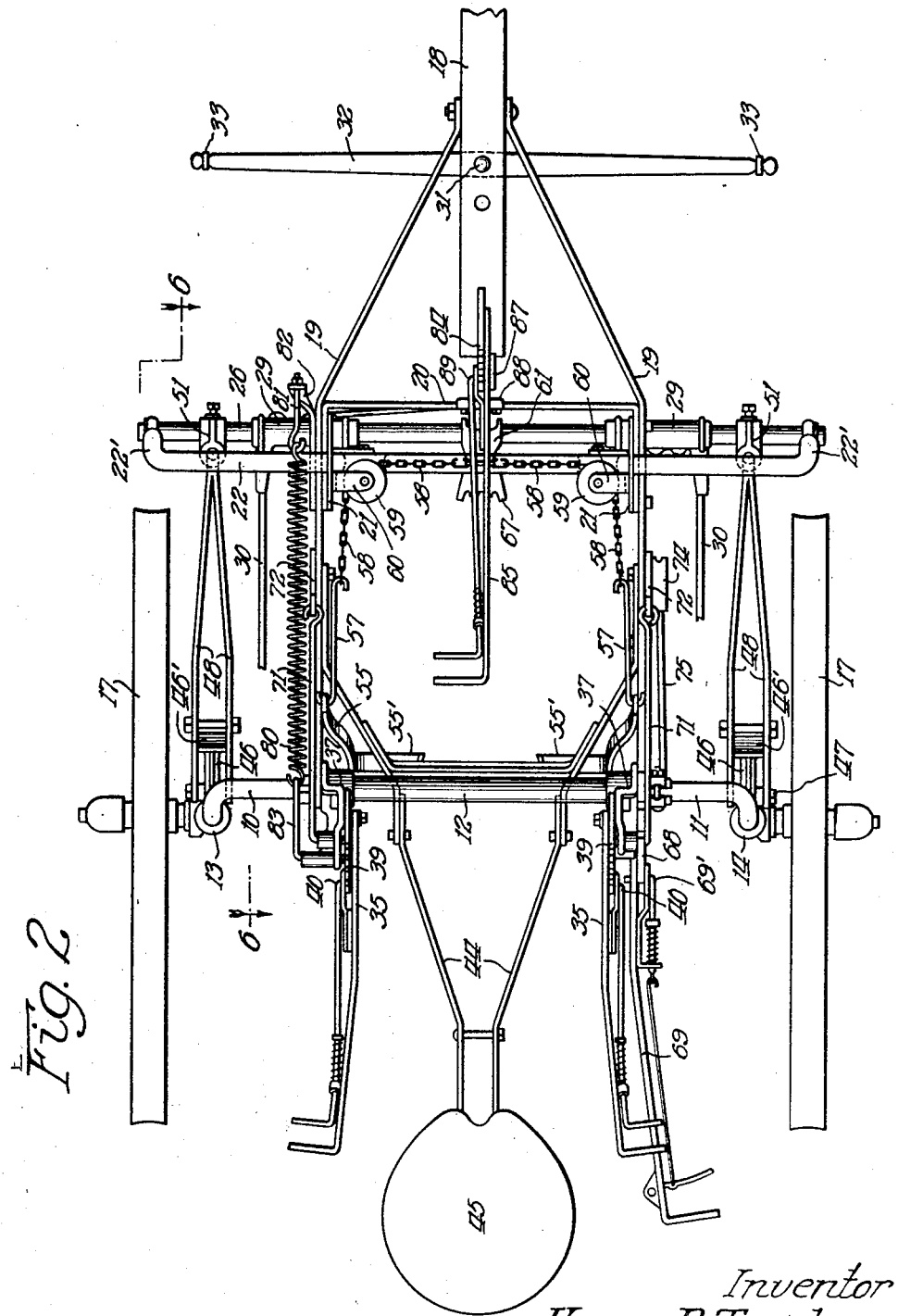
Fig. 2 is a plan view, with the plow gangs omitted for the sake of clearness.

18 designates the usual pole to the opposite sides of which are secured the usual draft bars 19 that, as shown in Figs. 2 and 11, extend rearwardly to the arch bar and are apertured to fit the horizontal limbs of the end sections 10 and 11. Between and connecting the draft bars 19 is the usual transverse brace bar 20; said draft and brace bars constituting a supporting frame structure.

Attached to the draft bars 19 are a pair of upstanding brackets 21 (Figs. 1 and 5) apertured for the passage therethrough of a horizontal carrying pipe 22, this latter having at its ends integral depending arms 22′, in the lower ends of which are secured eye-bolts 23. The carrying pipe 22 is supported on rollers 24 journaled in brackets 25 attached to the inner sides of the brackets 21. The eye-bolts 23 support a transversely disposed rod 26 that is locked against endwise movement relatively to the eye-bolts by washers 27 and cotter pins 28. Slidably mounted on the rod 26 are a pair of sleeve castings 29, formed with downwardly and rearwardly directed arms 29' to which the beams 30 of the plow gangs are connected. Pivoted at 31 (Figs. 1 and 2) to the draft pole 18 is the usual doubletree 32, from the ends of which are suspended the similar singletrees 33 (Fig. 1), the lower ends of which are connected by links 34 to the plow beams 30.

Figures 6, 8:
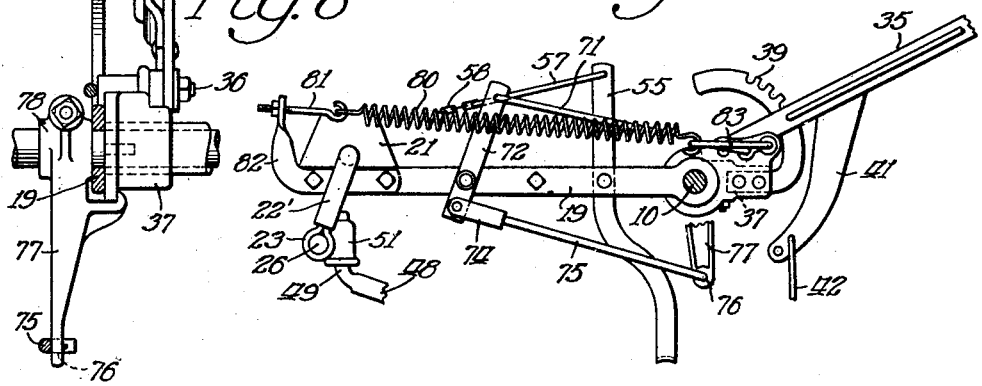
Fig. 6 is a vertical section taken on the off-set line 6—6 of Fig. 2.
Fig. 8 is a detail vertical section taken on the line 8—8 of Fig. 1, looking rearwardly.

Describing next the plow beam suspending means, 35 designates each of a pair of individual gang adjusting levers that are pivoted at 36 (Fig. 12) on sleeve castings 37 in turn mounted on the ends of the intermediate tubular member 12 of the arch bar, and, as shown in Figs. 11 and 13, fastened to the tube 12 by an internal spline 37' (Fig. 13) on the casting engaged with a slot 12' in the tube 12. Since a rigid coupling of this character is impractical without accurate machining, I supplement the coupling effect by a wedge key 38 extending through the casting 37 and having a bearing against the tube 12. Attached to the sleeve casting is a toothed segment bar 39 to which the adjusting lever is coupled by the usual spring pressed dog 40. Depending from each lever 35 is an arm 41 (Fig. 6), this latter being in turn connected to the plow beam by the usual link 42 and tension spring 43.

The seat bar 44 is attached at its forward forked end to the draft bars 19, as shown in Fig. 2, and on its rear end carries the seat 45.

Figure 1:
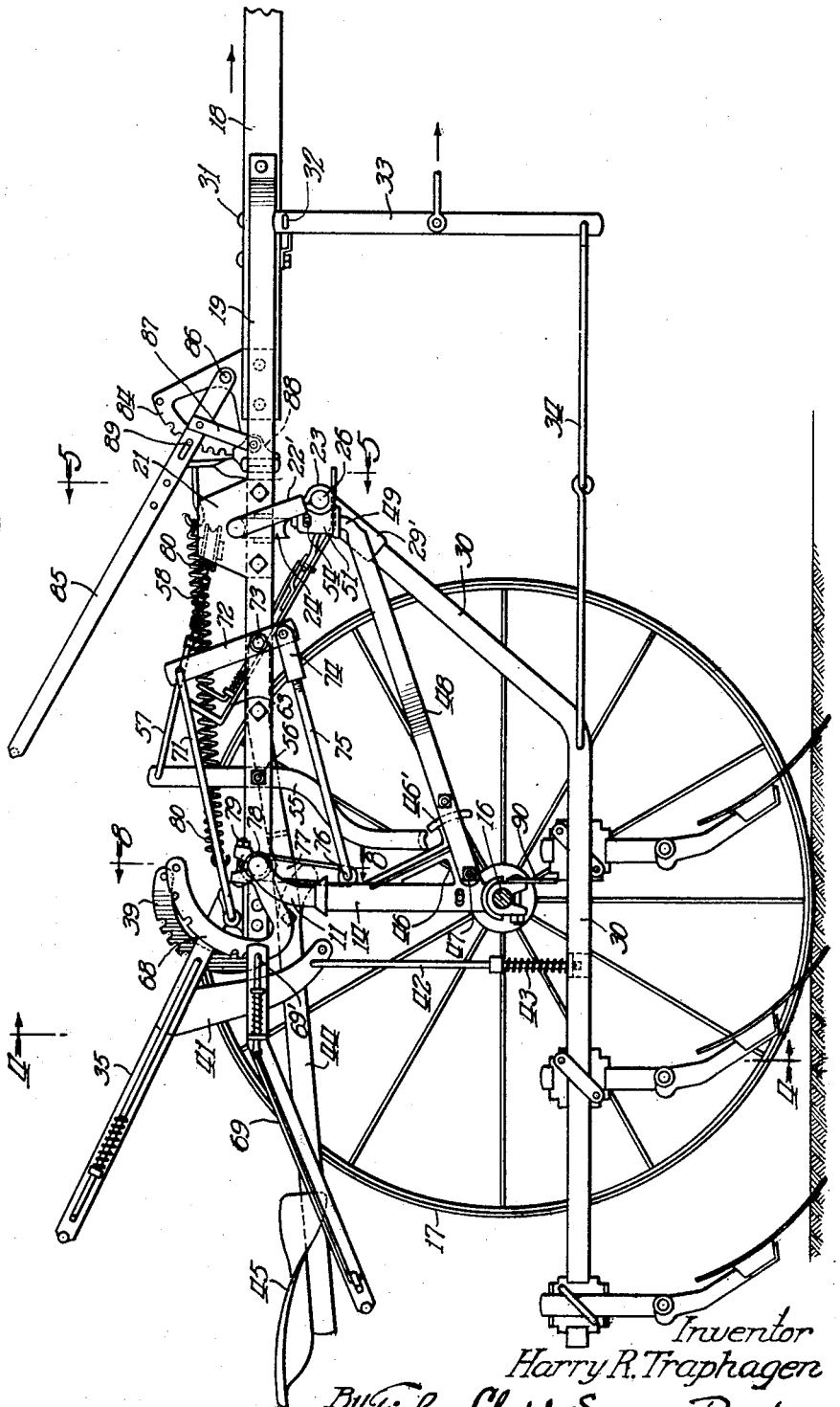
Fig. 1 is a side elevation of the cultivator with the near wheel removed.
Figure 3:
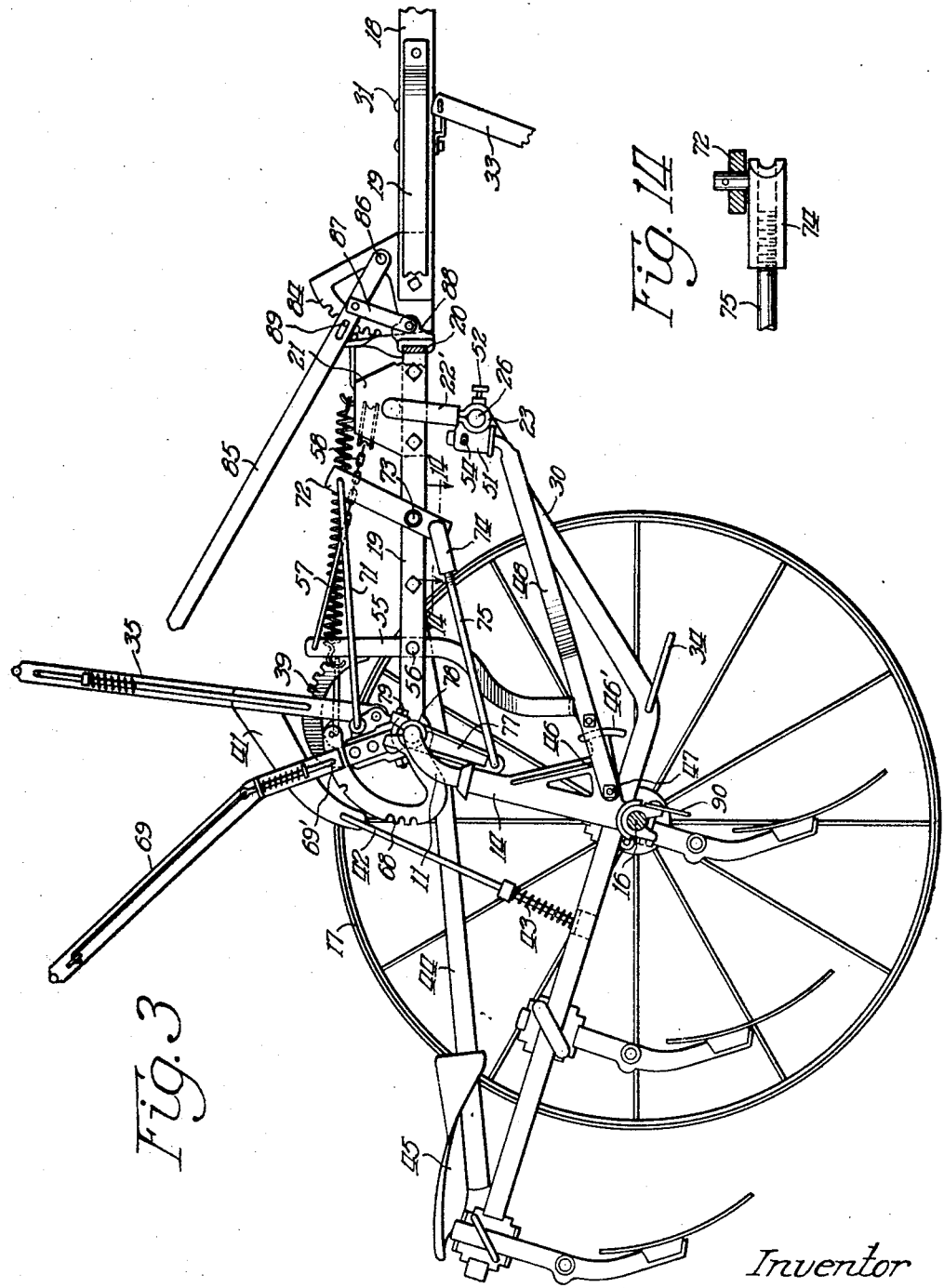
Fig. 3 is a side elevation, with the near wheel removed, showing the plow gangs raised out of the ground.
Figure 7:
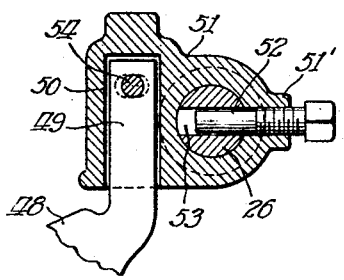
Fig. 7 is an enlarged detail vertical section, taken on the line 7—7 of Fig. 5.
Figure 9:
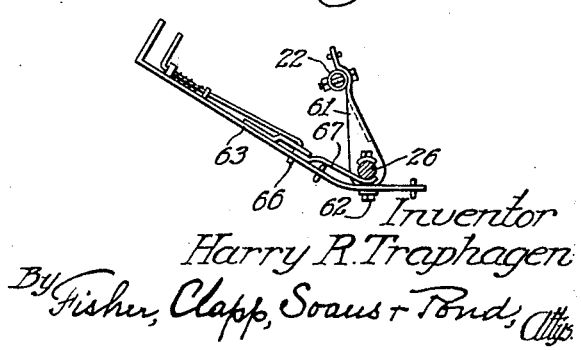
Fig. 9 is a sectional detail on the line 9—9 of Fig. 5, showing mechanism for shifting the plow gangs sidewise.

Describing next the steering means, which consists of pedal-operated mechanism for simultaneously angling the wheels 17 in the same direction, and referring to Figs. 1, 2 and 3, integral with each arch bar socket 14 is a forwardly projecting lateral bracket 46, formed on its forward end with a head 46'. Pivoted at 47 to the bracket 46, and straddling the head 46' are the twin limbs of a bifurcated arm 48 that extend upwardly and forwardly and merge into a substantially vertical pivot spindle 49 (Fig. 7) that enters from beneath a bearing socket 50 in a sleeve casting 51 that is mounted on the rod 26 and is secured on the latter by a set screw 52 screwed into a threaded boss 51' on the casting 51 and entering any one of a row of holes 53 in the rod 26. The spindle 49 is locked in the socket 50 by a cross pin 54 that extends through the walls of the socket and the spindle, and, as shown in Figs. 3 and 7, the holes in the walls of the socket are elongated horizontally to accommodate a slight relative turning movement of the spindle 49 during the wheel angling operation. From the foregoing it will readily be seen that, by imparting a sidewise swinging movement to the arms 48, the wheels 17 will be angled relatively to the line of draft. This side swing of the arms 48 is effected by a pedal-operated mechanism, as follows.

Figure 5:
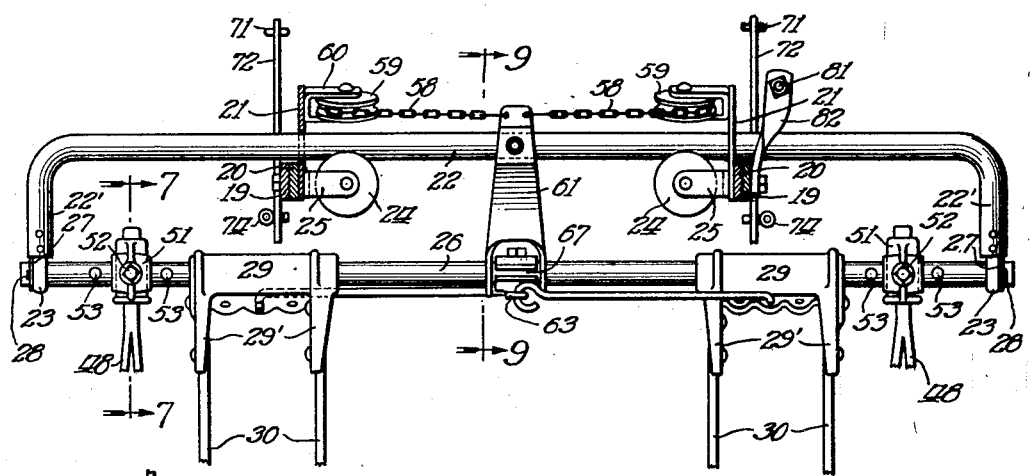
Fig. 5 is a vertical section taken on the line 5—5 of Fig. 1, looking rearwardly.

Referring to Figs. 1 and 4, 55 designates each of a pair of pedal levers that are pivoted at 56 on and crosswise of the draft bars 19, and terminate at their lower ends in inwardly directed pedals 55'. Hooked into the upper end of each lever 55 is a link 57, and attached to the forward end of this link is a chain 58 that, as best shown in Figs. 2 and 5, extends over a guide pulley 59 journaled in a bracket 60 on the inner side of the bracket 21 and extends thence and is connected to the upper end of an arm 61 that is pinned just below its upper end to the carrying pipe 22. The lower end of the arm 61 is forked and apertured to encircle the rod 26. When angling the wheels to the right, the right hand pedal 55' is pushed downwardly and forwardly, and this, through the described connections shifts the carrying pipe 22 and rod 26 in the same direction, thereby swinging the arms 48 to the right. A similar manipulation of the left pedal swings the arms 48 to the left. The provision of the brackets 46, carrying the heads 46' between the limbs of the duplex arms 48 obviates what would otherwise be severe bending strains on the pivot bolts 47. At the same time the arms 48 are free to swing up and down under the vertical oscillating movement of the frame.

A simple mechanism for varying the width of the gangs is shown mainly in Figs. 1, 2, 5, 9 and 10. Pivoted at 62 to and crosswise of the rod 26 is a rearwardly and upwardly extending lever 63. A link 64 (Fig. 10) connects the forward end of said lever to any one of a row of holes in one of the sleeve castings 29, and a similar link 65 connects the lever 63, on the other side of its pivot 62, with the corresponding one of a row of holes in the other sleeve casting 29. Manifestly, by swinging the lever 63 sidewise in one direction the sleeve castings 29 to which the plow gangs are attached are drawn closer together, and by swinging said lever in the opposite direction said sleeve castings are moved further apart. The lever 63 is locked in adjusted position by a spring pressed dog 66 engaged with a toothed segment 67 that is bolted to the under side of the shaft 26 and confined laterally between the side walls of the lower forked end of the arm 61.

I will next describe the combined beam lift and frame balance mechanism, the details of which are best illustrated in Figs. 11 and 12. The right hand draft bar 19 is continued rearwardly of the arch bar section 11 in the form of an upwardly and forwardly curved segment rack 68. The outer side of the sleeve casting 37, on that side of the implement, has a radial groove or channel in which is fitted the inner end of a master lever 69, being secured in place by a pair of screw bolts 70 which also serve the function of attaching the segment racks 39 to the sleeve castings 37. Pivotally mounted in the rear extension of each sleeve casting 37 is the inwardly bent end of an upper compensating link 71 that extends forwardly and is hooked into the upper end of a compensating lever 72 (Figs. 1 and 3), which lever is pivoted below its midlength at 73 on one of the draft bars 19. To the lower end of lever 72 is pivoted an internally threaded sleeve 74 (Fig. 14) into which is screwed the forward threaded end of a lower compensating link 75; this construction facilitating the assembling of the parts. The rear end of each link 75 is pivoted at 76 to the lower end of an arm 77 that is longer than the lower arm of lever 72 and is rigidly clamped on the arch bar end section 10 or 11 by a split hub 78 encircling the arch bar section and a clamp bolt 79. The master lever is locked to its segment rack by a spring-pressed dog 69', and when the operator desires to elevate the plow gangs clear of the ground, as when driving to or from the field, he swings the master lever 69 upwardly, as shown in Fig. 3. This rocks both of the sleeve castings 37, since they are both keyed to the rotatable arch bar sleeve 12, and lifts the plow gangs which are locked to the segment racks 39 (rigidly attached to the sleeve castings 37) by the dogs of the adjusting levers 35. At the same time, through the compensating links 71, 75, compensating levers 72, and arms 77, a torsional thrust is imparted to the horizontal limbs of the end sections 10 and 11 of the arch bar, which results in shifting the top of the arch bar and the draft bars and parts mounted thereon forwardly in the line of draft so as to compensate for the added weight of the elevated plow gangs in rear of the wheel axles, and maintain the balance of the implement on its wheels.

Since, in the arrangement shown and described, the thrust exerted through link 71 is multiplied at the lower end of lever 72, and the thrust exerted through link 75 is also multiplied in the torsional thrust on the axle, only a comparatively small part of the total manual power employed in raising the master lever 69 is required to effect the forward thrust of the arch bar and frame. To assist the operator in raising the gangs, the cultivator is preferably equipped with the usual counter balance spring 80 anchored at one end to a hook 81 secured to a bracket 82 attached to one of the draft bars 19, and at its other end to a hook 83 pivotally engaged with the rearward extension of one of the sleeve castings 37. It will be observed that, since the segment racks 39 of the gang adjusting levers 35 are rotatable relatively to the wheel carrying sections of the arch bar (being fast on the intermediate rotatable sleeve 12), the master lever 69 through its locking dog 69' and segment rack 68 (which latter is fast with the frame) functions also as a support to maintain the plow gangs in any position to which they may have been adjusted by their respective levers 35.

To level the pole 18, I provide a quadrant rack 84 on the rear end of the pole behind its pivotal connection to the draft beams 19, a lever 85 pivoted at 86 to the quadrant rack, and a link 87 pivoted at its upper end to the lever 85 and at its lower end to a bracket 88 on the transverse brace bar 20, which connects and spaces the draft bars 19, the lever being equipped with the usual spring pressed dog 89 for engagement with the teeth of the quadrant rack 84.

When the plow gangs 30 are adjusted to their maximum width apart, their outer frame bars approximate a position beneath the supports of the wheel axles, so that, when a shovel strikes an unusual obstruction there is danger that the gang frames will be thrown up and strike the lower sides of the supports. To obviate possible breakage from this cause, I provide on the lower sides of said supports, cam blocks 90, best shown in Fig. 4, formed with upwardly and inwardly inclined inner edges that, when struck by the gang beams, tend to deflect the latter inwardly, such inward deflection being permitted by the capacity of the rod 26 and the carrying pipe 22 to shift endwise.

I claim:

1. In a wheeled cultivator, the combination of an arch bar comprising angular sections and an intermediate tubular section sleeved on horizontal limbs of said end sections, wheels journaled on said end sections, a pole, a frame connecting the end sections of said arch bar and said pole, plow gangs articulated at their forward ends to said frame, sleeve castings keyed on the ends of the tubular member of said arch bar, gang suspending and adjusting means mounted on said sleeve castings, a segment rack fast with said frame, a master lever rigidly connected with one of said castings and cooperating with said segment rack, depending arms fast on the horizontal limbs of said end sections, compensating levers pivoted intermediate their ends on said frame, upper compensating links connecting said sleeve castings to the upper ends of said levers, and lower compensating links connecting the lower ends of said levers to said arms, whereby, when said master lever is elevated to lift the plow gangs clear of the ground, said arch bar and frame are thrown forwardly.

2. A specific embodiment of claim 1 wherein said compensating links, levers and arms are so assembled as to multiply the power transmitted therethrough.

3. In a wheeled cultivator, the combination of an arch bar comprising angular sections and an intermediate tubular section sleeved on horizontal limbs of said end sections, wheels journaled on said end sections, a pole, a frame connecting the end sections of said arch bar and said pole, plow gangs articulated at their forward ends to said frame, sleeve castings keyed on the ends of the tubular member of said arch bar, segment racks fast with said sleeve castings, individual gang adjusting levers pivoted on said sleeve castings and cooperating with said segment racks, means suspending said gangs from said adjustment levers, a segment rack fast with said frame, a master lever rigidly connected with one of said sleeve castings and cooperating with said last-named segment rack, depending arms fast on the horizontal limbs of said end sections, compensating levers pivoted intermediate their ends on said frame, upper compensating links connecting said sleeve castings to the upper ends of said levers, and lower compensating links connecting the lower ends of said levers to said arms, whereby, when said master lever is elevated to lift the plow gangs clear of the ground, said arch bar and frame are thrown forwardly.

4. In a wheeled cultivator, the combination of an arch bar comprising angular sections and an intermediate tubular section sleeved on horizontal limbs of said end sections, wheels journaled on said end sections, a pole, a frame connecting the end sections of said arch bar and said pole, a horizontal carrying pipe pivotally supported on and transversely of the forward portion of said frame and having depending arms, a transversely disposed rod mounted in and between said arms, plow gangs connected at their forward ends to said rod, sleeve castings keyed on the ends of the tubular member of said arch bar, rearwardly and upwardly extending segment racks fast with said castings, individual gang adjusting levers pivoted on said castings and cooperating with said segment racks, means suspending said gangs from said adjustment levers, a rearwardly and upwardly extending segment rack continuous with the rear end of one side of said frame, a master lever rigidly connected with one of said sleeve castings and cooperating with said last-named segment rack, depending arms fast on the horizontal limbs of said end sections, compensating levers pivoted intermediate their ends on said frame, upper compensating links connecting said sleeve castings to the upper ends of said levers, and lower compensating links connecting the lower ends of said levers to said arms, whereby, when said master lever is elevated to lift the plow gangs clear of the ground, said arch bar and frame are thrown forwardly.

5. In a wheeled cultivator, the combination with an arch bar, vertical bearings in which the depending limbs of said arch bar are journaled, wheel axles carried by said bearings, and a frame connected to said arch bar, of a steering mechanism, comprising an endwise shiftable rod mounted on and transversely of said frame, sleeve castings keyed to said rod and formed with vertical bearings, forwardly projecting brackets on said first-named bearings, bifurcated arms formed at their forward ends with vertical spindles journaled in said sleeve casting bearings, said arms straddling said brackets and at their rear ends horizontally pivoted to the latter, and pedal operated means for shifting said rod in either direction.

6. In a wheeled cultivator, the combination with an arch bar, vertical bearings for the depending limbs of said arch bar, wheel axles carried by said bearings, and a frame connected to said arch bar, of a steering mechanism, comprising an endwise shiftable carrying pipe disposed transversely of said frame and formed with depending arms, a rod supported by said arms, rollers supporting said carrying pipe, arms vertically pivoted at their forward ends to said rod and at their rear ends secured to said bearings, pedal levers pivoted on the sides of said frame, chains connecting said pedal levers to said carrying pipe, and guide pulleys for said chains.

7. In a wheeled cultivator, the combination with an arch bar, axle supports mounted on the ends of said arch bar, axles carried by said supports, wheels journaled on said axles, a frame connected to said arch bar, and a pair of plow gangs pivotally connected at their forward ends to said frame for rising and falling movements and underlying said arch bar, of means mounted on said axle supports serving, when struck by said gangs, to deflect the latter inwardly clear of said axle supports.

8. In a wheeled cultivator, the combination with an arch bar, axle supports mounted on the ends of said arch bar, axles carried by said supports, wheels journaled on said axles, a frame connected to said arch bar, and a pair of plow gangs pivotally connected at their forward ends to said frame for rising and falling movements and underlying said arch bar, of blocks mounted on the lower ends of said axle supports and formed with upwardly and inwardly inclined cam surfaces adapted, when struck by said gangs, to deflect the latter inwardly clear of said axle supports.

HARRY RANDALL TRAPHAGEN.